(12) United States Patent
Sullivan et al.

(10) Patent No.: US 6,277,035 B1
(45) Date of Patent: *Aug. 21, 2001

(54) MULTI-LAYER GOLF BALL AND METHOD OF MAKING SAME

(75) Inventors: Michael J. Sullivan, Chicopee; Mark Binette, Ludlow, both of MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/537,029

(22) Filed: Mar. 27, 2000

Related U.S. Application Data

(62) Division of application No. 08/490,963, filed on Jun. 15, 1995, now Pat. No. 6,042,488.

(51) Int. Cl.⁷ ............................ A63B 37/06; A63B 37/12
(52) U.S. Cl. ............................................ 473/374; 474/373
(58) Field of Search .................................... 473/374, 373, 473/377, 378

(56) References Cited

U.S. PATENT DOCUMENTS 6,042,488 * 3/2000 Sullivan et al. ..................... 473/374

* cited by examiner

*Primary Examiner*—Mark S. Graham
*Assistant Examiner*—Raeann Gorden

(57) ABSTRACT

Disclosed herein is a multi-layer golf ball having a core, an inner cover layer comprising an ionomer and having Shore D hardness of about 65 or less, and an outer cover layer having a different composition than the inner cover layer, comprising an ionomer, and having a Shore D hardness of more than 65. The sum of the thickness of the inner cover layer and the thickness of the outer cover layer is greater than 0.090 inches. A method for making the golf ball also is disclosed.

25 Claims, 1 Drawing Sheet

MULTI-LAYER GOLF BALL AND METHOD OF MAKING SAME

This application is division of 08/490,963 Jun. 15, 1995, U.S. Pat. No. 6,042,488.

FIELD OF THE INVENTION

The present invention generally relates to golf balls, and more particularly to a golf ball having a multi-layer ionomeric cover.

BACKGROUND OF THE INVENTION

Golf balls traditionally have been categorized in three different groups, namely as one-piece, two-piece and three-piece balls. Conventional two-piece golf balls include a solid resilient core having a cover of a different type of material molded thereon. Three-piece golf balls traditionally have included a liquid or solid center, elastomeric winding around the center, and a molded cover. Solid cores of both two and three-piece balls often are made of polybutadiene and the molded covers generally are made of natural balata, synthetic balata, or ionomeric resins.

Ionomeric resins are polymers containing interchain ionic bonding. As a result of their toughness, durability and flight characteristics, various ionomeric resins sold by E.I. DuPont de Nemours & Company under the trademark "Surlyn®" and by the Exxon Corporation (see U.S. Pat. No. 4,911,451) under the trademark "Escor®" and the trade name "Iotek", have become the materials of choice for the construction of golf ball covers over the traditional "balata" (transpolyisoprene, natural or synthetic) rubbers. The softer balata covers, although exhibiting enhanced playability properties, lack the durability (cut and abrasion resistance, fatigue endurance, etc.) properties required for repetitive play.

Ionomeric resins are generally ionic copolymers of an olefin, such as ethylene, and a metal salt of an unsaturated carboxylic acid, such as acrylic acid, methacrylic acid or maleic acid. Metal ions, such as sodium or zinc, are used to neutralize some portion of the acidic group in the copolymer, resulting in a thermoplastic elastomer exhibiting enhanced properties, i.e., durability, etc., for golf ball cover construction over balata.

While there are currently more than fifty (50) commercial grades of ionomers available from Exxon and DuPont, with a wide range of properties which vary according to the type and amount of metal cations, molecular weight, composition of the base resin (i.e., relative content of ethylene and methacrylic and/or acrylic acid groups) and additive ingredients such as reinforcement agents, etc., a great deal of research continues in order to develop a golf ball cover composition exhibiting the desired combination of playability properties.

Golf balls are typically described in terms of their size, weight, composition, dimple pattern, compression, hardness, durability, spin rate, and coefficient of restitution (COR). One way to measure the COR of a golf ball is to propel the ball at a given speed against a hard massive surface, and to measure its incoming and outgoing velocity. The COR is the ratio of the outgoing velocity to the incoming velocity and is expressed as a decimal between zero and one.

There is no United States Golf Association limit on the COR of a golf ball but the initial velocity of the golf ball must not exceed 250±5 ft/second. As a result, the industry goal for initial velocity is 255 ft/ second, and the industry strives to maximize the COR without violating this limit.

U.S. Pat. Nos. 4,431,193 and 4,919,434 disclose multi-layer golf balls. U.S. Pat. No. 4,431,193 discloses a multi-layer ball with a hard inner cover layer and a soft outer cover layer. U.S. Pat. No. 4,919,434 discloses a golf ball with a 0.4–2.2 mm thick cover made from two thermoplastic cover layers.

SUMMARY OF THE INVENTION

An object of the present invention is to provide a golf ball having a soft compression while maintaining good durability and a high coefficient of restitution.

Another object of the invention is to provide a golf ball having a good coefficient of restitution as compared to other golf balls having a similar compression and surface hardness.

A further object of the invention is to provide a large size golf ball having a soft compression and moderate spin rate.

Yet another object of the invention is to provide a soft golf ball having a moderate spin rate and good carrying distance while maintaining a relatively soft compression.

Another object of the invention is to provide a method of making a golf ball having the properties described above.

The invention in a preferred form is a golf ball comprising a core, an inner cover layer comprising an ionomer and having a Shore D hardness of about 65 or less, and an outer cover layer comprising an ionomer and having a Shore D hardness which is greater than the Shore D hardness of the inner cover layer and is at least about 60. The sum of the thickness of the inner cover layer and the thickness of the outer cover layer is at least 0.090 inches.

The golf ball of the invention preferably has a COR of at least 0.780, more preferably at least 0.790, and most preferably at least about 0.800. In a particularly preferred form of the invention, the golf ball is an oversized ball having a diameter of at least 1.70 inches. The golf ball has a weight in the range of 43.0–46.0 g. Preferably, the ratio of the diameter of the ball to the sum of the thickness of the inner cover layer and outer layer is less than 19:1 and more preferably less than about 18:1. The PGA compression of the golf ball according to a preferred embodiment of the invention is no more than about 110, more preferably no more than about 107 and even more preferably no more than about 100.

Another preferred form of the invention is a method for making a multi-layer golf ball. The method comprises the steps of (1) obtaining a golf ball core, (2) forming an inner cover layer over the core, the inner cover layer comprising an ionomer and having a Shore D hardness of about 60 or less and (3) forming an outer cover layer over the inner cover layer, the outer cover layer having a Shore D hardness of at least about 60 and being harder than the inner cover layer. The sum of the thickness of the inner cover layer and the thickness of the outer cover layer is at least 0.090 inches.

The invention accordingly comprises the several steps and the relation of one or more of such steps with respect to each of the others and the article possessing the features, properties, and the relation of elements exemplified in the following detailed disclosure.

DETAILED DESCRIPTION OF THE INVENTION

Figure 1:
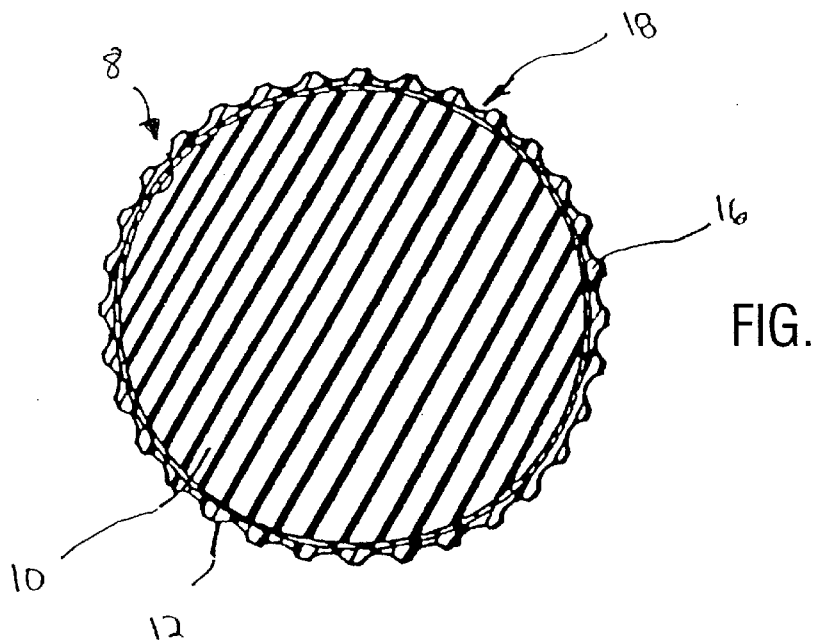
FIG. 1 shows a cross-sectional view of a golf ball according to a preferred embodiment of the invention.
Figure 2:
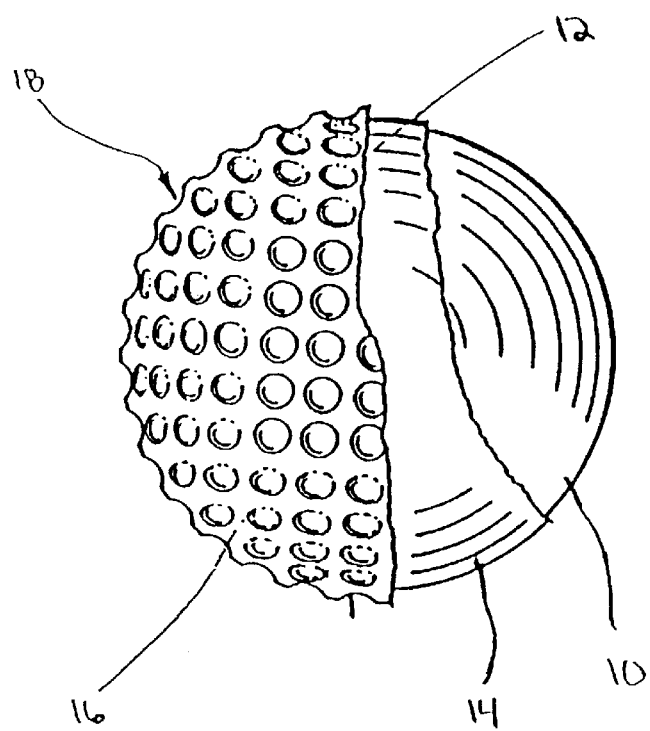
FIG. 2 shows a diametrical cross-sectional view of the golf ball shown in FIG. 1.

The golf ball according to the invention has a central core and a thick cover which includes at least two ionomeric layers. The inner cover layer is softer than the outer cover layer. This type of construction results in a golf ball having a favorable combination of soft compression and low spin while maintaining good COR.

Referring now to the drawings, a golf ball according to the invention is shown and is designated as 8. The ball preferably has a diameter of at least 1.68 inches. The invention is particularly useful with golf balls having a diameter of 1.70 inches or more.

The golf ball includes a central solid core 10 and a multi-layer cover 12. The multi-layer cover includes an inner cover layer 14, and an outer cover layer 16 with dimples 18. The inner cover layer 14 comprises an ionomer and is softer than the outer cover layer 16. The ionomer that is used to form the inner cover layer 14 can be a single type of ionomer or a blend of two or more types of ionomers. Hardening and/or softening modifiers can be blended with the ionomers. The inner cover layer has a Shore D hardness of about 65 or less, more preferably 20–63 and most preferably 40–60 (ASTM D-2240).

In a preferred form of the invention, the inner cover layer comprises an ionomer with an average wt % acid content of about 15 or less which is at least 10% neutralized. In a particularly preferred form of the invention, the inner cover layer 14 constitutes a blend of two types of ionomers in which one component of the blend is an ethylene-acrylic acid or ethylene-methacrylic acid copolymer containing $\geq 15$ wt % acid groups which are at least partially neutralized with a cation, and the other type of ionomer is a terpolymer of ethylene, acrylic acid or methacrylic acid and a softening termonomer such as butyl acrylate or methyl acrylate, resulting in an overall wt % acid content of about 15 or less.

The outer cover layer 16 also comprises an ionomer. The outer layer 16 can contain a single type of ionomer or a blend of two or more types of ionomers. Furthermore, a hardening and/or softening modifier can be added. The outer cover layer is harder than the inner cover layer, and has a Shore D hardness of about 60 or more, more preferably 65 or more and most preferably 68 or more (ASTM D-2240). In a particularly preferred form of the invention, the outer cover layer contains an ionomer having at least 16 weight % acid groups, which are at least partially neutralized.

The inner and outer layers together form a cover having a thickness of 0.090–0.250 inches, more preferably about 0.10–0.20 inches, and most preferably about 0.11–0.15 inches. Preferably, the inner cover layer has a thickness of 0.025–0.200 inches, and more preferably 0.050–0.100 inches. The outer cover layer preferably has a thickness of about 0.025 to 0.200 inches, or more preferably 0.050–0.100 inches. The ratio of the diameter of the ball to the thickness of the cover, i.e. the sum of the thickness of the inner cover layer and the outer cover layer, is no more than about 19:1, preferably no more than about 17:1 and more preferably no more than about 15:1.

The hardness of the inner and outer cover layers, and the compositions and thicknesses of these layers are appropriate to result in a golf ball having a COR of at least 0.780, more preferably at least 0.790 and most preferably at least 0.800. The golf ball of the invention has an overall PGA compression of 30–110, more preferably 50–107, and most preferably 60–90. Preferably, the spin rate of the golf balls is no more than about 8000 revolutions per minute (rpm) when struck with a 9-iron under conditions of launch angle, ball speed and tee position which produce a spin rate of about 7100 rpm for a two-piece hard covered ball (1994 Top-Flite XL) and a spin rate of about 9700 rpm for a thread wound balata covered ball (1994 Titleist Tour 100) using the same club. This relatively low spin rate provides the advantage of less sideways spin for improved accuracy and less backspin for improved rolling distance.

The core of the golf ball preferably is made of a crosslinked unsaturated elastomer and preferably comprises a thermoset rubber such as polybutadiene, but also can be made of other core materials which provide sufficient COR. The diameter of the core is determined based upon the desired overall ball diameter, minus the combined thicknesses of the inner and outer cover layers. The COR of the core is appropriate to impart to the finished golf ball a COR of at least 0.780, and preferably at least 0.790. The core typically has a diameter of about 1.0–1.6 inches, preferably 1.4–1.6 inches, a PGA compression of 80–100, and a COR in the range of 0.770–0.830.

Conventional solid cores are typically compression molded from a slug of uncured or lightly cured elastomer composition comprising a high cis content polybutadiene and a metal salt of an $\alpha$, $\beta$, ethylenically unsaturated carboxylic acid such as zinc mono or diacrylate or methacrylate. To achieve higher coefficients of restitution in the core, the manufacturer may include fillers such as small amounts of a metal oxide such as zinc oxide. In addition, larger amounts of metal oxide than those that are needed to achieve the desired coefficient are often included in conventional cores in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiators such as peroxides are admixed with the core composition so that on the application of heat and pressure, a complex curing cross-linking reaction takes place.

The inner cover layer preferably comprises an ionomer having an average wt % acid content of about 15 or less which is at least 10% neutralized. Preferably, the inner cover layer 14. includes a blend of hard and soft ionomer resins including but not limited to those described in U.S. Pat. No. 4,884,814 and 5,120,791, both of which are incorporated herein by reference. For example, a blend of a high modulus ionomer (i.e., a hard ionomer) and a low modulus ionomer (i.e., a soft ionomer) in a mixture can be used. A high modulus ionomer is one which has a flexural modulus of about 15,000–70,000 psi or more as measured under ASTM method D-790. The hardness of this type of ionomer is at least 50 on the Shore D scale as measured in accordance with ASTM method D-2240. A low modulus ionomer which can be blended with the high modulus ionomer to form the inner layer has a flexural modulus of about 1,000 to about 15,000 psi (ASTM D-790), and a hardness of about 20–40 on the Shore D scale (ASTM D-2240).

The hard ionomer resins used in blends to form the inner cover layer 14 include ionic copolymers which are the e.g. sodium, zinc, magnesium, calcium, manganese, nickel, potassium or lithium, etc. salt, or blend thereof, of the reaction product of an olefin having from 2 to 8 carbon atoms and an unsaturated monocarboxylic acid having from 3 to 8 carbon atoms and which result in a ball having the desired combination of COR, compression, and inner cover layer hardness. The carboxylic acid groups of the copolymer may be totally or partially, that is 10–100%, neutralized. The hard ionomeric resins typically are copolymers of ethylene with acrylic and/or methacrylic acid. Two or more hard ionomer resins can be blended.

The metal cation salts utilized in the invention are those salts which provide the metal cations capable of neutralizing, to various extents, the carboxylic acid groups of the high acid copolymer. These include acetate, oxide or hydroxide salts of e.g. lithium, calcium, zinc, sodium, potassium, nickel, magnesium, and manganese, etc.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium-acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide and magnesium acetate. Sources of manganese include manganese acetate and manganese oxide.

The metal cation neutralized high acid ionomer resins can be produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi. Other blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

Examples of commercially available hard ionomeric resins which can be used in a blend to form the inner cover layer 14 include the hard sodium ionic copolymer sold under the trademark Surlyn® 8940 and the hard zinc ionic copolymer sold under the trademark Surlyn® 9910. Surlyn® 8940 is a copolymer of ethylene with methacrylic acid with about 15 weight % acid which is about 29% neutralized with sodium ions. This resin has an average melt flow index of about 2.8. Surlyne® 9910 is a copolymer of ethylene and methacrylic acid with about weight % acid which is about 58% neutralized with zinc ions. The average melt flow index of Surlyn® 9910 is about 0.7. Additional examples include Iotek 4000, Iotek 4010, Iotek 8000, Iotek 8020, Iotek 8030, Iotek 7010 and Iotek 7030 which are sold by Exxon Corporation. It is to be understood that the above examples are for illustrative purposes and are by no means intended to be limiting.

Non-limiting examples of soft ionomers to be blended with the above-described hard ionomers to form the inner cover layer 14 of the inventive golf ball comprise sodium, zinc magnesium, calcium, manganese, nickel, potassium or lithium, etc. salts of a terpolymer of an olefin having from about 2 to 8 carbon atoms, acrylic acid or methacrylic acid, and a softening comonomer which is an unsaturated monomer of the acrylate ester class having from 1 to 21 carbon atoms. The soft ionomer is preferably an ionomer made from an acrylic acid-based polymer and an unsaturated monomer of the acrylate ester class. The soft (low modulus) ionomers have a hardness from about 20 to 40 as measured on the Shore D scale and a flexural modulus from about 1,000 to about 15,000, as measured in accordance with ASTM method D-790.

Certain ethylene-acrylic acid based soft ionomer resins developed by the Exxon Corporation under the designation "Iotek 7510" may be combined with known hard ionomers such as those indicated above to produce the inner cover. The combination produces higher CORs at equal or lower levels of hardness, higher melt flow (which corresponds to improved, more efficient molding, i.e., fewer rejects) as well as significant cost savings versus the outer layer of multi-layer balls produced by other known hard-soft ionomer blends as a result of the lower overall raw materials costs and improved yields. Furthermore, Iotek 7520, Surlyn® 8320 and Surlyn® 8120 also can be used.

It has been determined that when hard-soft ionomer blends are used for the inner cover layer, good results are achieved when the relative combination is in a range of about 90 to about 10% hard ionomer and about 10 to about 90% soft ionomer. The results are improved by adjusting the range to about 75 to 25% hard ionomer and 25 to 75% soft ionomer. Even better results are noted at relative ranges of about 60 to 40% hard ionomer resin and about 40 to 60% soft ionomer resin.

Specific formulations which may be used in the cover composition are included in the examples set forth in U.S. Pat. No. 5,120,791 and 4,884,814. The present invention is in no way limited to those examples.

The outer cover layer 16 of the golf ball is harder than the inner cover layer and generally, but not necessarily, has a different chemical composition than the inner cover layer. The outer cover layer 16 preferably comprises a high acid ionomer resin or high acid ionomer blend in which more than 10 weight % of the acid groups are neutralized. Preferably, the outer cover layer 16 is formed from a blend of two or more high acid ionomer resins that are neutralized to different extents using different metal cations. Softening modifiers can be used to achieve the desired Shore hardness of the outer cover layer.

The high acid ionomers which can be used in formulating the outer cover layer of the golf ball are ionic copolymers which are the metal salts of the reaction product of an olefin having from about 2 to 8 carbon atoms and an unsaturated monocarboxylic acid having from about 3 to 8 carbon atoms. As nonlimiting examples, sodium, zinc, magnesium, manganese, potassium, calcium, nickel and lithium can be used as the neutralizing cation. Preferably, the ionomeric resins are copolymers of ethylene with either acrylic or methacrylic acid. In some circumstances, an additional comonomer such as an acrylate ester, e.g. iso-n-butylacrylate, etc. can also be used to produce a somewhat softer terpolymer. The carboxylic acid groups of the copolymer are partially neutralized by the metal ions, i.e., about 10–75% or more preferably about 30–70%. Each of the high acid ionomer resins which may be included in the outer cover layer composition preferably contains more than 16% by weight of a carboxylic acid, preferably 17–25% by weight of a carboxylic acid, and most preferably about 18.5–21.5% by weight of a carboxylic acid. Examples of commercially available high acid methacrylic acid-based ionomers which can be used in accordance with the invention include Surlyn® AD-8422 (sodium cation), Surlyn® 8162 (zinc cation), Surlyn® SEP-503-1 (zinc cation), and Surlyn® SEP-503-2 (magnesium cation). According to DuPont, all of these ionomers contain from about 18.5 to about 21% by weight methacrylic acid.

Examples of high acid acrylic acid-based ionomers which can be used in the present invention also include the Escor® or Iotek High Acid Ethylene Ionomers produced by Exxon, including Iotek Ex-959 and Iotek Ex-960. Furthermore, a number of other high acid ionomers neutralized to various extents by different types of metal cations, including manganese, lithium, potassium, calcium and nickel and several new high acid ionomers and/or high acid ionomer blends other than sodium, zinc and magnesium are now available for golf ball cover production.

As indicated above, softening comonomers can be included in the ionomeric inner and/or outer cover layers. Non-limiting examples of a softening comonomer include vinyl esters of aliphatic carboxylic acids wherein the acids have 2 to 10 carbon atoms, vinyl ethers wherein the alkyl group contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Examples of a number of copolymers suitable for use to produce the high acid ionomers used in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 30 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

As indicated above, the inner cover layer 14 and/or outer cover layer 16 optionally may include hardening or softening modifiers, non-limiting examples of which include a metal stearate, such as zinc stearate, or another fatty acid salt, as described in commonly assigned U.S. Pat. Nos. 5,306,760 and 5,312,857. One purpose of the metal stearate or other fatty acid salt is to reduce the cost of production of the ball without effecting overall performance of the finished ball. Furthermore, polar-group modified rubbers can be blended with ionomers as described, for example, in commonly assigned U.S. Pat. Nos. 4,986,545, 5,098,105, 5,187,013, 5,330,837 and 5,338,610. Thermoplastic elastomers which act as hardening or softening agents, including polyurethane, a polyester elastomer such as that sold by DuPont as Hytrel®, a polyester polyurethane such as B.F. Goodrich Company's Estane® polyester polyurethane X-4517, and a polyester amide such as that sold by Elf Atochem S.A. under the name Pebax®, can be added. A plastomer such as that sold by Exxon under the name Exact™, e.g., Exact™ 4049 can be included. Various plasticizers and processing aids also can be used.

When the golf ball of the invention has more than two cover layers, the inner cover layer as defined in this application can be formed from two or more layers which, taken together, meet the requirements of softness, thickness and compression of the layer or layers which are defined herein as the inner cover layer. Similarly, the outer cover layer can be formed from two or more layers which, taken together, meet the requirements of hardness, thickness and compression of the layer or layers which are defined herein as the outer cover layer. Furthermore, one or more additional, very thin ionomeric or non-ionomeric layers can be added on either side of the inner cover layer as long as the objectives of the invention are achieved.

Having generally described the invention, the following examples are included for purposes of illustration so that the invention may be more readily understood and are in no way intended to limit the scope of the invention unless otherwise specifically indicated.

EXAMPLE 1

About 2 dozen thermoset polybutadiene golf ball cores having a conventional composition, a PGA compression of 93, a COR of 0.782 and a diameter of 1.47 inches were molded in a conventional manner. An inner cover layer of a first ionomer formed from a blend of a soft acrylic acid based ionomer containing a softening comonomer and a hard acrylic acid based ionomer, designated as ionomer 1, having a thickness of 0.050 inches and a Shore D hardness of 55 was injection molded over the cores. The resulting covered cores had a PGA compression of 94 and a COR of 0.789.

An outer cover layer formed from a blend of two hard acrylic acid based ionomers and designated as ionomer 2 was injection molded over the inner cover layer. The outer cover layer had a thickness of 0.055 inches and a Shore D hardness of 68. The balls were primed and clear coated in a uniform manner. The balls with the two-part cover had an average PGA compression of about 99, and a COR of about 803. The spin rate of the balls was determined by striking the balls with a 9-iron under conditions of launch angle, ball speed and tee position which produced a spin rate of about 7100 rpm for a two-piece hard covered ball (1994 Top-Flite XL) and a spin rate of about 9700 rpm for a thread wound balata covered ball (1994 Titleist Tour 100) using the same club.

The properties of the balls, core and cover layers are shown on Table 1.

EXAMPLES 2–4

The procedure of Example 1 was repeated using three different combinations of inner and outer cover layer materials at the same cover layer thicknesses. The results are shown on Table 1.

COMPARATIVE EXAMPLES 1–2

The procedure of Example 1 was repeated with the exception that the same material was used for the inner and outer cover layers of a particular ball. In Comparative Example 1, two layers of ionomer 2 were used. In Comparative Example 2, two layers of ionomer 4 were used. The results are shown on Table 1.

While the balls of Comparative Examples 1 and 2 exhibited favorable COR, their PGA compressions were unfavorably high. On the other hand, the balls of Examples 1–3 had favorable soft compressions while maintaining good COR. The balls of example 4 had a reasonably good compression while maintaining a good COR. It is also noted that the balls of Examples 1–2 had a somewhat higher spin rate than the balls of Comparative Example 1, and the balls Examples 3–4 had a somewhat higher spin rate than the balls of Comparative Example 2. This slightly higher spin will contribute to improved playability and feel versus the balls of Comparative Examples while still being relatively low in spin as compared to soft covered balls.

COMPARATIVE EXAMPLES 3–6

Conventional thermoset polybutadiene golf ball cores having a diameter of 1.57 inches, a PGA compression of 88, and a COR of 780 were covered with a single layer of cover material having a thickness of 0.055 inches. Four different types of ionomeric covers were used. The balls were then primed and clear coated in the same manner as the balls of Examples 1–4. The resulting two-piece golf balls had measurements of PGA compression, COR, Shore D cover hardness, and spin as shown on Table 1.

As shown in Comparative Examples 3–6, the COR of the golf balls increased as the hardness of the ball increased. As shown by comparative Example 6, ionomer 1 is too soft for use alone as an outer cover layer and results in an insufficient COR. As shown by Comparative Example 5, ionomer 3 is also soft and produced a ball having a marginally acceptable COR and a relatively hard compression. The balls of Comparative Examples 3 and 4 are inferior to the balls of Examples 1–4 because for a given COR, the PGA compressions of the balls of Comparative Examples 3 and 4 are relatively hard, even though the core compressions were softer (prior to cover molding) than those of Examples 1–4.

EXAMPLE 5–6

The procedure of Example 1 was repeated with the exception that cores having sizes of 1.43 inches and 1.545 inches were used. Furthermore, inner and outer cover layers of different thicknesses were used. The cover layer thicknesses and properties as well as resulting golf ball properties are shown on Table 1.

COMPARATIVE EXAMPLE 7

The procedure of Example 5 was repeated with the exception that the inner and outer cover layers were formed from the same material. The results are shown on Table 1.

While Example 5 and Comparative Example 7 both had ionomeric cover layers with the same overall thickness, the ball of Example 5 is superior to that of Comparative Example 7 in that the compression of the ball of Comparative Example 7 is too high. Again, the spin rate for Example 5 is somewhat higher than Comparative Example 7, which will contribute to improved feel and playability while not being so high (as with a soft-covered ball) as to cause problems (slice/hook) for the less skilled golfer. In order to reduce compression, rather than reducing the outer cover layer thickness, as was done in Comparative Example 3, Example 5 shows that by using a multi-layer ionomer cover with a softer inner layer and a harder outer layer, a golf ball having a favorable combination of relatively soft compression and good coefficient of restitution can be obtained.

As shown by Example 6, a slight reduction in the thickness of the overall ionomeric cover material does not substantially affect the compression of the ball and contributes to favorable values of COR.

TABLE 1

| Example # | Size (inches) | COMP (PGA) | Hardness (Shore D) [if ready available] | COR[1] | Inner Cover Layer | | | | |
|---|---|---|---|---|---|---|---|---|---|
| | | | | | Material | Thickness (inches) | COMP[2] (PGA) | COR[1,3] | Hardness (Shore D) |
| 1 | 1.47 | 93 | | 782 | Ionomer 1 | 0.050 | 94 | 789 | 55 |
| 2 | 1.47 | 93 | | 782 | Ionomer 3 | 0.050 | 94 | 795 | 63 |
| Comp. 1 | 1.47 | 93 | | 782 | Ionomer 2 | 0.050 | 94 | 799 | 68 |
| 3 | 1.47 | 93 | | 782 | )onomer 1 | 0.050 | 94 | 789 | 55 |
| 4 | 1.47 | 93 | | 782 | Ionomer 3 | 0.050 | 94 | 795 | 63 |
| Comp. 2 | 1.47 | 93 | | 782 | Ionomer 4 | 0.050 | 95 | 805 | 73 |
| Comp. 3 | 1.57 | 88 | | 780 | None | — | — | — | — |
| Comp. 4 | 1.57 | 88 | | 780 | None | — | — | — | — |
| Comp. 5 | 1.57 | 88 | | 780 | None | — | — | — | — |
| Comp. 6 | 1.57 | 88 | | 780 | None | — | — | — | — |
| 5 | 1.43 | — | | 787 | Ionomer 1 | 0.090 | 90 | 792 | 56 |
| 6 | 1.545 | 89 | | 790 | Ionomer 1 | 0.033 | 89 | 794 | 56 |
| Comp. 7 | 1.43 | — | | 787 | Ionomer 2 | 0.090 | 103 | 815 | 68 |

| Example # | Outer Cover Layer | | | Ball | | |
|---|---|---|---|---|---|---|
| | Material | Thickness inches) | Hardness (Shore D) | COMP (PGA) | COR[1] | SPIN (RPM) |
| 1 | Ionomer 2 | 0.055 | 68 | 99 | 803 | 7508 |
| 2 | Ionomer 2 | 0.055 | 68 | 102 | 809 | 7650 |
| Comp. 1 | Ionomer 2 | 0.055 | 68 | 109 | 819 | 7390 |
| 3 | Ionomer 4 | 0.055 | 73 | 101 | 809 | 6626 |
| 4 | Ionomer 4 | 0.055 | 73 | 107 | 816 | 6358 |
| Comp. 2 | Ionomer 4 | 0.055 | 73 | 112 | 830 | 6258 |
| Comp. 3 | Ionomer 2 | 0.055 | 68 | 99 | 800 | 7331 |
| Comp. 4 | Ionomer 4 | 0.055 | 73 | 104 | 808 | 6516 |
| Comp. 5 | Ionomer 3 | 0.055 | 63 | 98 | 792 | 8421 |
| Comp. 6 | Ionomer 1 | 0.055 | 55 | 93 | 782 | 9479 |
| 5 | Ionomer 2 | 0.057 | 68 | 101 | 799 | 7435 |
| 6 | Ionomer 2 | 0.057 | 68 | 100 | 809 | 7382 |
| Comp. 7 | Ionomer 2 | 0.057 | 68 | 115 | 820 | 7230 |

[1]Actual COR values have been multipled by 1000
[2]COMP of inner cover layer and core
[3]COR of inner cover layer and core

What is claimed is:

1. A golfball, comprising:
a core,
an inner cover layer formed directly over the core, the inner cover layer substantially consisting of ionomer and having a thickness of 0.05–0.10 inches and a Shore D hardness of 40–55, and
an outer cover layer comprising an ionomer, the outer cover layer being harder than the inner cover layer and having a Shore D hardness of at least about 60,
the sum of the thickness of the inner cover layer and the thickness of the outer cover layer being at least 0.090 inches.

2. A golf ball according to claim 1, wherein the ball has a coefficient of restitution of at least 0.780.

3. A golf ball according to claim 1, wherein the outer cover layer has a thickness of about 0.025–0.200 inches.

4. A golf ball according to claim 1, wherein the outer cover layer has a Shore D hardness of at least 65.

5. A golf ball according to claim 4, wherein the core comprises a thermoset rubber.

6. A golf ball according to claim 1, wherein the inner cover layer comprises an ionomer having an average wt % acid content of about 15 or less which is at least 10% neutralized.

7. A golf ball according to claim 1, wherein the outer cover layer comprises an ionomer having an average wt % acid content of about 16 or more that is at least 10% neutralized.

8. A golf ball according to claim 1, wherein the golf ball has a diameter of at least 1.70 inches.

9. A golf ball according to claim 1, wherein the core comprises a thermoset rubber.

10. A golf ball according to claim 1, wherein the inner cover layer comprises a blend of a hard ionomer and a soft ionomer.

11. A golf ball according to claim 1, wherein the PGA compression of the ball is no more than about 110.

12. A golf ball according to claim 1, wherein the PGA compression of the ball is no more than about 100.

13. A golf ball according to claim 1, wherein the outer cover layer has a Shore D hardness of about 73.

14. A golf ball according to claim 1, wherein the golf ball has no more than two cover layers.

15. A golf ball according to claim 1, wherein the golf ball has a diameter of at least 1.70 inches.

16. A golf ball according to claim 1, wherein the outer cover layer has a thickness of 0.050–0.057 inches.

17. A golf ball comprising:
a core,
an inner cover layer formed directly over the core, the inner cover layer substantially consisting of ionomer and having a thickness of 0.05–0.10 inches and a Shore D hardness of 40–55, and
an outer cover layer comprising an ionomer, having a Shore D hardness of at least 60, and being harder than the inner cover layer,
wherein the golf ball has a PGA compression of no more than about 110 and a coefficient of restitution of at least 0.780, and the ratio of the diameter of the ball to the sum of the thickness of the inner cover layer and the thickness of the outer cover layer is less than 19:1.

18. A golf ball according to claim 12, wherein the golf ball has no more than two cover layers.

19. A method of making a multi-layer golf ball, comprising:
obtaining a golf ball core,
forming an inner cover layer directly over the core, the inner cover layer substantially consisting of ionomer and having a thickness of 0.05–0.10 inches and a Shore D hardness of 40–55, and
forming an outer cover layer comprising an ionomer over the inner cover layer, the outer cover layer having a Shore D hardness of at least about 60 and being harder than the inner cover layer, the combined thickness of the inner cover layer and the outer cover layer being at least 0.090 inches.

20. A method according to claim 19, wherein the core, inner cover layer and outer cover layer are formed such that the PGA compression of the ball is no more than about 107.

21. A method according to claim 19, wherein the core, inner cover layer and outer cover layer are formed such that the ball has a coefficient of restitution of at least 0.780.

22. A method according to claim 19, wherein the outer cover layer is applied in a thickness of about 0.025–0.200 inches.

23. A method according to claim 19, wherein the diameter of the core, and the thicknesses of the inner cover layer and outer cover layer are selected in order to form a golf ball having a diameter of at least 1.70 inches.

24. A method according to claim 19, wherein the outer cover layer has a Shore D hardness of about 73.

25. A method according to claim 19, wherein the outer cover layer substantially consists of ionomer.

* * * * *